United States Patent
Steffen et al.

(10) Patent No.: US 8,976,035 B2
(45) Date of Patent: Mar. 10, 2015

(54) METHODS AND APPARATUS FOR SENSING MOTION OF A PORTABLE CONTAINER AND PROVIDING HUMAN PERCEPTIBLE INDICIA BASED ON THE SENSED MOTION

(71) Applicants: Michael A. Steffen, Machesney Park, IL (US); Rodrigo L. Borras, Marshalltown, IA (US)

(72) Inventors: Michael A. Steffen, Machesney Park, IL (US); Rodrigo L. Borras, Marshalltown, IA (US)

(73) Assignee: Freescale Semiconductor, Inc., Austin, TX (US)

( * ) Notice: Subject to any disclaimer, the term of this patent is extended or adjusted under 35 U.S.C. 154(b) by 69 days.

(21) Appl. No.: 13/829,549

(22) Filed: Mar. 14, 2013

(65) Prior Publication Data

US 2014/0266753 A1    Sep. 18, 2014

(51) Int. Cl.
*G08B 21/00* (2006.01)
*G08B 23/00* (2006.01)

(52) U.S. Cl.
CPC ..................... *G08B 23/00* (2013.01)
USPC ......................................................... 340/669

(58) Field of Classification Search
USPC ................. 340/669, 539.1, 655, 679; 99/324; 434/118, 127
See application file for complete search history.

(56) References Cited

U.S. PATENT DOCUMENTS

| | | | |
|---|---|---|---|
| 3,908,531 A * | 9/1975 | Morley ............................ | 99/336 |
| 4,922,435 A * | 5/1990 | Cahlander et al. ............ | 700/247 |
| 5,172,328 A * | 12/1992 | Cahlander et al. ............ | 700/211 |
| 5,189,944 A * | 3/1993 | Rasmussen et al. ............ | 99/334 |
| 6,606,498 B2 | 8/2003 | Chen et al. | |
| 6,698,848 B1 | 3/2004 | Corvin et al. | |
| 6,826,761 B1 | 11/2004 | Damon et al. | |
| 7,012,607 B1 | 3/2006 | Kurlander et al. | |
| 7,039,893 B2 | 5/2006 | DenBraber | |
| 7,628,107 B2 * | 12/2009 | Vaseloff et al. ................. | 99/468 |
| 7,688,306 B2 * | 3/2010 | Wehrenberg et al. ......... | 345/158 |
| 8,102,246 B2 | 1/2012 | Davidson, II | |
| 8,419,433 B2 * | 4/2013 | Do et al. ........................ | 434/127 |
| 8,419,434 B2 * | 4/2013 | Do et al. ........................ | 434/127 |
| 2007/0050685 A1 | 3/2007 | Tsai | |
| 2007/0057068 A1 | 3/2007 | Tsai | |
| 2008/0137486 A1 | 6/2008 | Czarenk et al. | |
| 2008/0169281 A1 * | 7/2008 | Borovicka et al. ............ | 219/441 |
| 2008/0306706 A1 | 12/2008 | Markovic | |
| 2009/0040052 A1 | 2/2009 | Cameron et al. | |
| 2010/0029242 A1 | 2/2010 | Orr et al. | |
| 2010/0171601 A1 | 7/2010 | Davidson, II | |
| 2011/0173354 A1 | 7/2011 | Hall et al. | |
| 2011/0267026 A1 | 11/2011 | Locker et al. | |
| 2012/0029752 A1 | 2/2012 | Johnson et al. | |

* cited by examiner

*Primary Examiner* — Phung Nguyen
(74) *Attorney, Agent, or Firm* — Sherry W. Schumm (57) ABSTRACT

Embodiments of systems and methods include a sensor subsystem (e.g., within a container-mounted device) that produces a sensor output, and a processing system that implements a state machine. Upon entry into a first state, the processing system starts a timer, and while in a second state, the processing system waits for a specific sensor output value to be received. The processing system transitions from the first state to the second state upon expiration of the timer, and the processing system transitions from the second state to the first state when the sensor output corresponds to the specific sensor output value. When the state machine is in the second state, the output device produces a human-perceptible indicia configured to prompt a human user to perform an action that is likely to cause the sensor to produce the sensor output that corresponds to the specific sensor output value.

20 Claims, 6 Drawing Sheets

METHODS AND APPARATUS FOR SENSING MOTION OF A PORTABLE CONTAINER AND PROVIDING HUMAN PERCEPTIBLE INDICIA BASED ON THE SENSED MOTION

TECHNICAL FIELD

Embodiments relate generally to sensor-based methods and apparatus, and more particularly to methods and apparatus for sensing motion of a portable container and providing user prompts based on sensed motion.

BACKGROUND

Sensors are utilized in a wide variety of portable devices for the purposes of sensing motion, acceleration, and deceleration along one or more axes. Based on the sensor outputs, the device may alter its operation in some manner. For example, a device may include one or more accelerometers and/or gyroscopes, which produce outputs that enable the device to determine its orientation, and to adjust the orientation of displayed information so that it appears upright to a device user. Sensor sub-systems may provide information that enables a variety of other features to be performed within a device, as well. With the ever present desire to enhance the functionality and improve the user experience of electronic devices, new applications for sensors are desired.

DETAILED DESCRIPTION

Embodiments described herein include systems that include sensor subsystems attached to portable containers, and user interfaces that operably communicate with the sensor subsystems. In a more particular application, the system is configured to assist the user at performing a process that includes multiple steps, where at least one of the steps may be a timed step, and at least one of the steps includes the user moving the portable container (e.g., shaking, tilting, or otherwise moving the container) and/or changing environmental conditions to which the portable container is exposed. One or more output devices of the user interface may be used to prompt or guide the user through the various process steps, and the sensor subsystem may detect movement, orientation, and/or environmental conditions experienced by the portable container at appropriate points in the process. When appropriate movement, orientation, and/or environmental conditions are detected, the system may proceed to the next step.

The various embodiments may be applied to a wide variety of systems and processes. For example, embodiments may be catered to apply to nearly any process in which a user is involved in proceeding through process steps, where transition to a next step is predicated on a certain sensed condition. Although embodiments described below include sensor systems that include various types of sensors that are configured to detect various types of sensed conditions, it should be understood that other embodiments may include sensor systems that include other types of sensors that are configured to detect other types of sensed conditions. For example, in various embodiments, systems may include any combination of one or more sensors configured to sense motion, orientation, change in orientation, acceleration, shock, vibration, magnetic field, pressure, temperature, the presence of a chemical, the absence of a chemical, a humidity level, and so on. In such systems, transition from one process step to another may depend on the presence of, absence of, or magnitude of the condition that is capable of being sensed.

Further, for the purpose of example, a process is described below that includes the use of a portable container (specifically a French fry basket) with an attached sensor subsystem, where the portable container is manipulated by a user to cook food. It should be understood that various embodiments may be used in the context of other food cooking processes that involve different sequences of steps, as well as in other types of processes that do not involve food preparation. For example, embodiments may be catered to apply to manufacturing and/or assembly processes in which a portable object is transitioned through a sequence of steps, and the transitions depend on the presence of, absence of, or sufficient magnitude of particular sensed conditions.

For example, a sensor subsystem may be attached to a portable object (e.g., a container or an article of assembly), and the portable object may be transitioned through any combination of movement steps, heating steps, immersion steps (e.g., in gasses or liquids), pressure exposure steps, other steps which involve environmental condition changes, and so on. For example, the use of various embodiments in a manufacturing context may help to ensure that a given product on an assembly and/or production line has been moved to various pre-defined positions and/or placed in various pre-defined orientations as part of a production line flow. In a more specific example, embodiments may be employed in a system to assist in the calibration of an electronic system, where the calibration process includes a sequence of several pre-defined rotations (or placements in several pre-defined positions or orientations) so that internal sensors within the product (e.g., sensors that are distinct from sensors 222-228, FIG. 2) can reach calibration. As an even more specific example, embodiments may be employed in a system used to calibrate a magnetometer of an electronic compass (e.g., contained within a phone or tablet computer). The device may be placed in a container that includes a container mounted device (e.g., container mounted device 210, FIG. 2), and the system may be used to ensure that the container (and thus the device) is moved in a certain manner (e.g., in a figure-8 motion). Accordingly, although a particular example embodiment is described below, which describes a specific type of portable container (a French fry basket), a specific type of sensor (an accelerometer), and a process that involves a specific sequence of steps, it is to be understood that the inventive subject matter is not limited to the particular example embodiment described herein. Instead, the inventive subject matter encompasses a wide variety of systems and processes in which application of the various embodiments may be employed.

To convey various aspects of the inventive subject matter, a specific example embodiment in the context of cooking French fries is described below in conjunction with FIGS. 1, 5, and 6. In addition, more generalized example embodiments are described below in conjunction with FIGS. 2-4. Those of skill in the art would understand, based on the description herein, how to apply the more generalized example embodiments illustrated and described in conjunction with FIGS. 2-4 to a wide variety of systems and processes, such as the embodiments of systems and processes relating to the French fry cooking embodiment illustrated and described in conjunction with FIGS. 1, 5, and 6.

Figure 1:
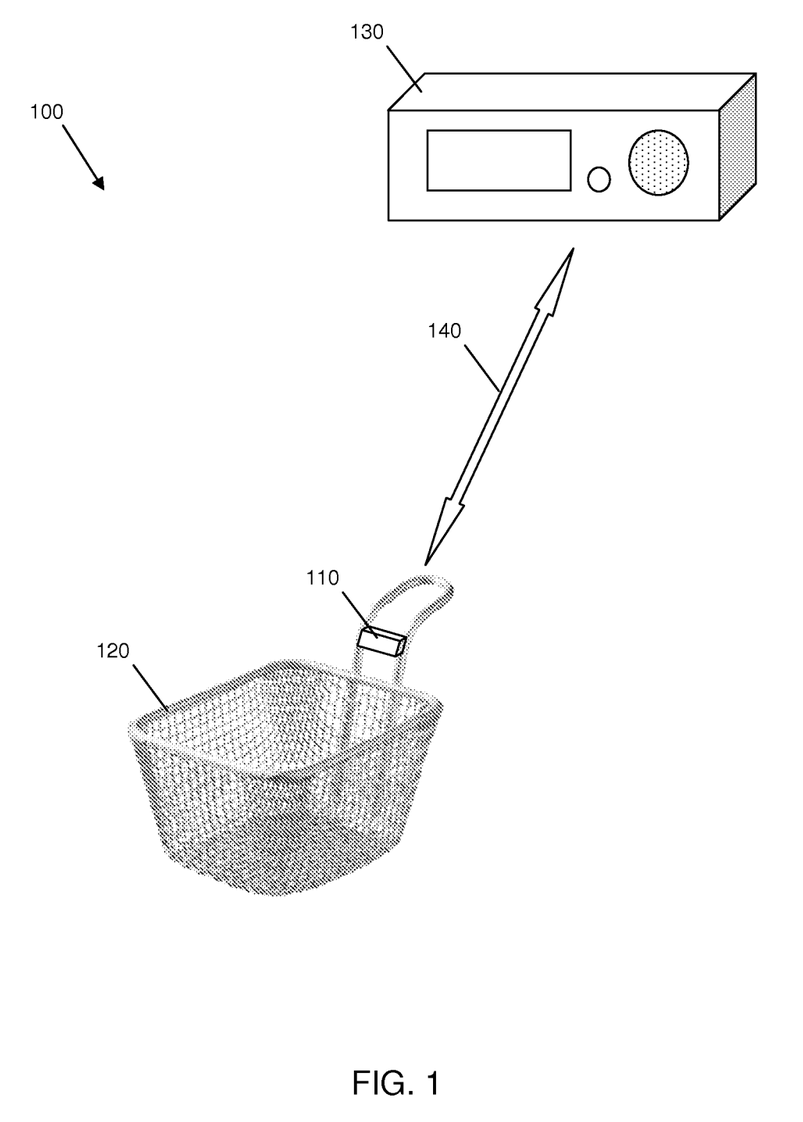
FIG. 1 illustrates a system that includes a portable container with a container mounted device configured to sense motion of the container, according to an example embodiment.

FIG. 1 illustrates a system 100 that includes a portable container, specifically French fry basket 120, with a container mounted device 110 configured to sense motion of the basket 120, according to an example embodiment. In addition, system 100 also includes a user interface device 130, and the container mounted device 110 and the user interface device 130 are configured to communicate with each other over a wireless communication link 140. In an alternate embodiment, the container mounted device 110 and the user interface device 130 may communicate with each other over a wired link (e.g., a cable that extends between the container mounted device 110 and the user interface device 130).

The container mounted device 110 includes a sensor subsystem (e.g., sensor subsystem 220, FIG. 2) and a wireless communication interface (e.g., wireless communication interface 248, FIG. 2), in an embodiment. As will be described in more detail below, the sensor subsystem is configured to produce a sensor output indicating acceleration values along one or more directions (e.g., acceleration along x, y, and/or z axes). Because the container mounted device 110 and the sensor subsystem are attached to the basket 120, the sensor subsystem is more specifically configured to produce a sensor output indicating acceleration of the basket 120 along one or more directions. According to an embodiment, the container mounted device 110 communicates the acceleration values to the user interface device 130 over the wireless communication link 140.

Figure 2:
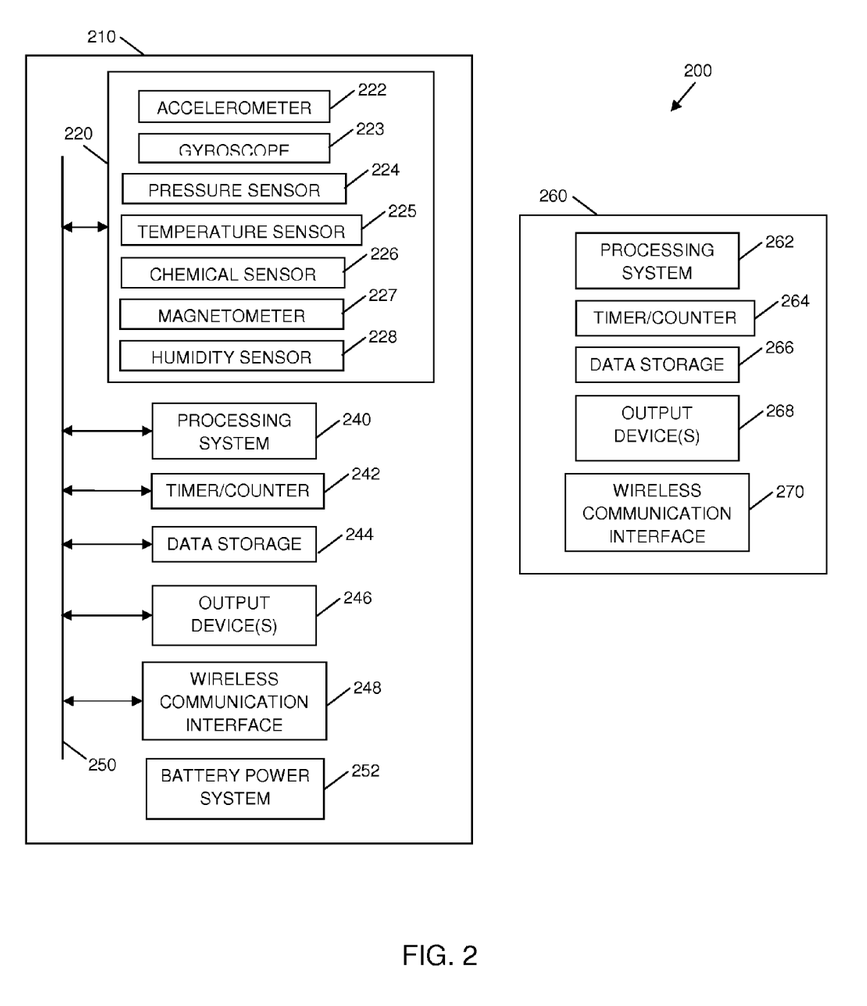
FIG. 2 illustrates a simplified block diagram of a sensor system with a container mounted device and a remote user interface device according to another example embodiment.

According to an embodiment, the user interface device 130 includes a wireless communication interface (e.g., wireless communication interface 270, FIG. 2), a processing system (e.g., processing system 262, FIG. 2), and one or more output devices (e.g., output devices 268, FIG. 2). The wireless communication interface is configured to receive the acceleration values from the wireless communication link 140, and to provide the received acceleration values to the processing system. The processing system is configured to receive and process the acceleration values, and to cause the output device(s) to produce human-perceptible indicia based on the received acceleration values. In an alternate embodiment, the container mounted device 110 instead may include a processing system configured to receive and process the acceleration values, and to communicate other information over the wireless communication link 140 that enables the user interface device 130 to determine when and how to produce the human-perceptible indicia. In still another alternate embodiment, the container mounted device 110 may include both the processing system and the various components of the user interface device 130, and the wireless communication interfaces may be excluded from the system 100. In other words, in such an alternate embodiment, the various components of the system may be completely self-contained in the container mounted device 110.

System 100 also may include the ability to detect the location(s) of container mounted device 110 and/or user interface device 130, and/or to detect a distance between the container mounted device 110 and the user interface device 130, in an embodiment. In either case, system 100 may further include the ability to indicate the location(s) and/or distance to the user and/or to a monitoring system. For example, location and/or distance detection may be used to ensure that the container mounted device 110 (and thus the basket 120) is kept within a certain distance of the user interface device 130, to ensure that the devices 110, 130 are within communication range of each other, to ensure that the container mounted device 110 is kept within a pre-defined perimeter (e.g., a safety perimeter) or a designated area, and so on. Location and/or distance detection may be accomplished, for example, using a Global Positioning System (GPS) receiver, measurements of wireless signal strength (e.g., using Received Signal Strength Indicator (RSSI) equipment), passive or active radio frequency identification (RFID) technology, ultrasound technology, and so on.

According to an embodiment, the processing system implements a state machine or process flowchart that enables the system to prompt the user through a sequence of steps relating to a particular process. The system more specifically prompts the user through a series of human-perceptible indicia produced by the output device(s), and which prompt is produced at any given time depends on which of multiple states the state machine currently is in. According to an embodiment, and as will be described in more detail later in conjunction with FIGS. 4 and 6, the state machine has at least two operational states, where one of the operational states (e.g. state 404, FIG. 4) includes monitoring a timer or counter, and the other operational state (e.g., state 406, FIG. 4) includes monitoring a sensor output. Transition from the timed state to the sensor-monitoring state is performed upon expiration of the timer or a counter value, and transition from the sensor monitoring state to the timed state is performed when a specific sensor output is received.

As will be explained in detail below, the combination of a container mounted device (e.g., container mounted device 110), a user interface device (e.g., user interface device 130), and implementation of a state machine such as the state machine described briefly above provides a system that may prompt a user through a sequence of pre-determined process steps that involve user interaction with the container. In system 100, for example, upon initiation of a French fry cooking process, the container mounted device 110 may produce sensor outputs that enable the system first to determine that the user has loaded basket 120 with uncooked French fries, and has immersed the basket 120 in heated oil. Under these conditions, the state machine may enter a first timed cooking state. Upon expiration of a first cooking timer, the state machine may enter a state in which the system 100 waits for the user to shake the basket 120 to loosen the partially-cooked French fries. More specifically, the system 100 may prompt the user, via user interface device 130, to lift the basket 120 out of the oil, shake it, and return the basket 120 to the oil. One or more accelerometers within the container mounted device 110 may produce sensor outputs consistent with shaking the basket 120, which indicate to the system 100 that the state machine may be advanced to a second timed cooking state. Upon expiration of a second cooking timer, the state machine may enter a state in which the system 100 waits for the user to remove the basket 120 from the oil and tip the basket 120 over to unload the cooked French fries. More specifically, the system 100 may prompt the user, again via the user interface device 130, to lift the basket 120 out of the oil and tip it over to unload the French fries. Once the accelerometers within the container mounted device 110 produce sensor outputs consistent with these motions, the process may end.

FIG. 2 illustrates a simplified block diagram of a sensor system 200 with a container mounted device 210 (e.g., container mounted device 110, FIG. 1) and a remote user interface device 260 (e.g., user interface device 130, FIG. 1) according to another example embodiment. In the example embodiment described below, the container mounted device 210 and the user interface device 260 communicate with each other over a wireless communication link (e.g., wireless communication link 140, FIG. 1). In alternate embodiments, the container mounted device 210 and the user interface device 260 may be combined and both mounted to a container, and thus alternatively may communicate over hardwired links.

Container mounted device 210 includes a sensor subsystem 220, a processing system 240, a timer and/or counter 242, and data storage 244, in an embodiment. According to further embodiments, container mounted device 210 further may include one or more output devices 246, a wireless communication interface 248, and/or a battery power system 252. In still other alternate embodiments, container mounted device 210 may include hardware and/or software components that enable system 200 to detect the location of container mounted device 210 (e.g., a GPS receiver, triangulation hardware/software, and so on), and/or to detect the distance of container mounted device 210 from user interface device 260 (e.g., an RSSI detector, passive or active RFID device, ultrasound equipment, and so on). The various components of container mounted device 210 may derive power from a battery inserted in battery power system 252, allowing container mounted device 210 to be a completely portable device. Alternatively, container mounted device 210 may be configured to receive power from a connection with another power source (e.g., line power). In addition, the various components of container mounted device 210 may communicate via one or more communication busses 250 and/or other conductive channels. Data storage 244 (e.g., RAM, ROM, and/or flash memory) may be utilized to store various types of data (e.g., sensor data), program instructions, and other information.

The components of container mounted device 210 are included within a housing, which is configured to be securely mounted to a container (e.g., basket 120, FIG. 1), in an embodiment. Accordingly, as the container is moved, oriented in a particular manner, and/or is subjected to particular environmental conditions, the container mounted device 210 simultaneously is moved, oriented in the particular manner, and/or is subjected to the particular environmental conditions. In order to sense movement, orientation, and/or environmental conditions, the sensor subsystem 220 include one or more sensors. For example, sensor subsystem 220 may include any combination of one or more accelerometers 222, gyroscopes 223, pressure sensors 224, temperature sensors 225, chemical sensors 226, magnetometers 227 (i.e., magnetic field sensors), and/or humidity sensors 228. Depending on the sensors included within sensor subsystem 220, sensor subsystem 220 may be configured to produce sensor outputs indicating sensed conditions selected from motion (along one or more directions or around one or more axes), orientation, change in orientation, acceleration (in one or more directions), shock, vibration, pressure, temperature, the presence or absence of one or more chemicals, magnetic field strength and direction, humidity level, and other environmental characteristics. In any event, sensor subsystem 220 is configured to convert the analog values produced by the various sensors 222-228 into digital sensor outputs for further processing.

Processing system 240 is configured to receive the sensor outputs from sensor subsystem 220. According to an embodiment, processing system 240 may implement the above described state machine, although the above described state machine alternatively may be implemented by a processing system 262 of the remote user interface device 260. In an embodiment in which processing system 262 of the remote interface device 260 implement the state machine, processing system 240 may prepare the sensor outputs for transmission using wireless communication interface 248 (e.g., processing system 240 may packetize the sensor outputs for transmission using a pre-defined communication protocol). In an alternate embodiment, the container mounted device 210 and the user interface device 260 may communicate with each other over a wired link (e.g., a cable that extends between the container mounted device 210 and the user interface device 260). In such an embodiment, both the container mounted device 210 and the user interface device 260 may include appropriate wired communication interfaces, in lieu of wireless communication interfaces 248, 270).

In an embodiment in which processing system 240 implements the above described state machine, processing system 240 may transition through various states based on the sensor outputs from sensor subsystem 220 and information or signals from timer/counter 242. According to an embodiment, timer/counter 242 is configured to implement count-up and/or count-down timers having various durations, and to provide signals to processing system 240 which indicate the initiation, progress, and/or expiration of the various timers. According to another embodiment, timer/counter 242 is configured to count a number of times that an event occurs (e.g., the number of times that a user performs some action). As will be explained in more detail later, expiration of various timers and/or the achievement of a particular count value may trigger transitions from one state to another. Timer/counter 242 is shown as distinct from processing system 240. In an alternate embodiment, processing system 240 may implement timers and/or counters internally based on received clock signals and/or other received signals (e.g., signals from the sensor subsystem 220).

As will be described in more detail later, as processing system 240 proceeds through the various states of a pre-defined process, processing system 240 may control one or more output devices 246 to produce human-perceptible indicia intended to prompt a user of the device to perform an action or to wait for a process to complete. In an alternate embodiment, the remote user interface device 260 may include various output devices 268, and container mounted device 210 instead may communicate information to the user interface device 260 that enables the output devices 268 of the user interface device 260 to produce the human-perceptible indicia. Either way, the output devices 246, 268 may include any combination of one or more output devices selected from speakers, lights, light emitting diodes (LEDs), vibration-producing devices, display devices, computing devices (e.g., desktop, laptop, and/or tablet computers), headsets, display glasses, pagers, telephones, radios, and so on. Accordingly, the output devices 246, 268 may produce various types of human-perceptible indicia, including audible tones, spoken statements, lights, vibrations, and displayed indicia. Although examples described below discuss the provision of human-perceptible indicia that includes strobed lights and tones, it is to be understood that other indicia also or alternatively could be provided, such as those described above.

Wireless communication interface 248 is configured to communicate with a corresponding wireless communication interface 270 of user interface device 260 over a wireless communication link (e.g., wireless communication link 140, FIG. 1). More specifically, wireless communication interface 248 is configured to receive data to be transmitted from processing system 240 (e.g., packetized sensor data, state data, and/or output device control data, in various embodiments), and to transmit the data over the wireless communication link. The data may be communicated using any of a variety of communication protocols (e.g., a protocol consistent with the Bluetooth communication protocol) within any of multiple radio frequency (RF) bands (e.g., an Industrial, Scientific, and Medical (ISM) band).

User interface device 260 includes one or more output devices 268, in an embodiment. According to further embodiments, user interface device 260 may include a processing system 262, timer/counter 264, data storage 266, and/or a wireless communication interface 270. In still other alternate embodiments, user interface device 260 may include hardware and/or software components that enable system 200 to detect the location of user interface device 260 (e.g., a GPS receiver, triangulation hardware/software, and so on), and/or to detect the distance of user interface device 260 from container mounted device 210 (e.g., an RSSI detector, passive or active RFID device, ultrasound equipment, and so on). The functionality of each of the components of user interface device 260 essentially has been described above. Basically, the components included within user interface device 260 depend on how the processing capabilities are distributed within system 200. For example, when user interface device 260 and container mounted device 210 communicate wirelessly, user interface device 260 includes wireless communication interface 270 to receive and digitize wireless signals received from the wireless communication link, and processing system 262 may be configured to process data within the corresponding packets. When user interface device 260 is configured to be capable of implementing the state machine, processing system 262 may be included within user interface device 260 to provide that capability. Finally, when user interface device 260 is configured to produce some or all human-perceptible indicia, user interface device 260 includes the corresponding output device(s) 268. Finally, data storage 266 (e.g., RAM, ROM, and/or flash memory) may be utilized to store various types of data (e.g., sensor data), program instructions, and other information.

As indicated previously, some or all of the capabilities of user interface device 260 may be included in container mounted device 210, in alternate embodiments. When all of the capabilities of user interface device 260 are included in container mounted device 210, the wireless communication interfaces 248, 270 may be excluded from the system. The various state diagrams and flowcharts illustrated in FIGS. 3-6 may be implemented in any of the system embodiments discussed above (e.g., in systems in which system capabilities are distributed between distinct devices, and in systems in which the system capabilities are implemented in a single, self-contained, container mounted device). Again, FIGS. 3 and 4 depict a more generalized embodiment, and FIGS. 5 and 6 depict a specific example embodiment in the context of a process for cooking French fries.

Figure 3:
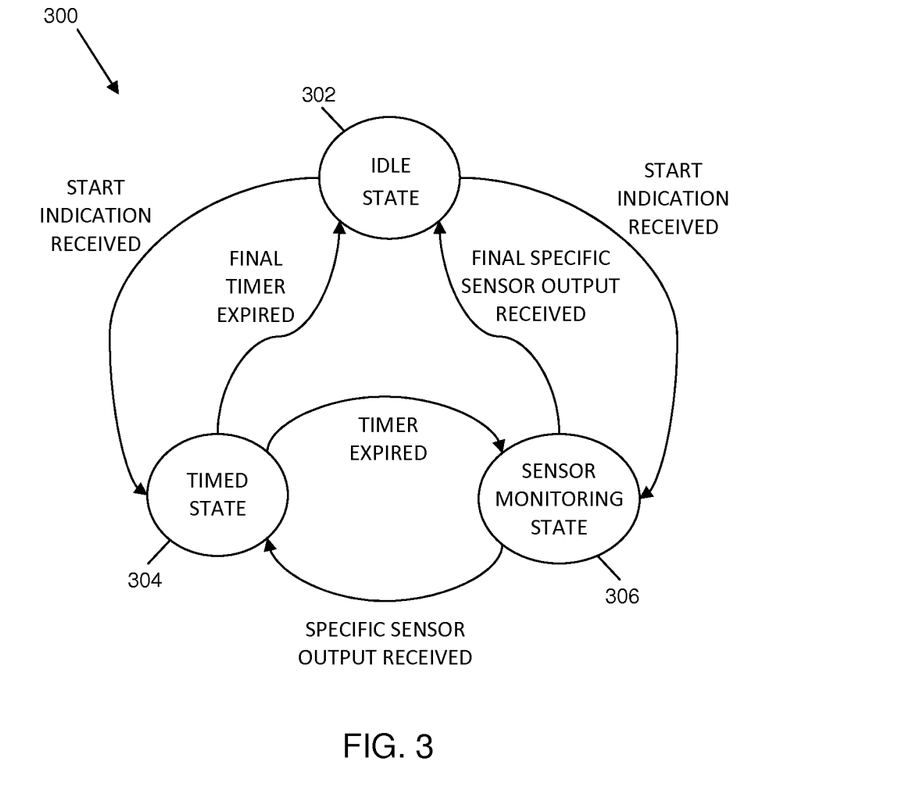
FIG. 3 illustrates a diagram of a state machine that may be implemented in a system with a container mounted sensor subsystem and a user interface device, according to an example embodiment.
Figure 4:
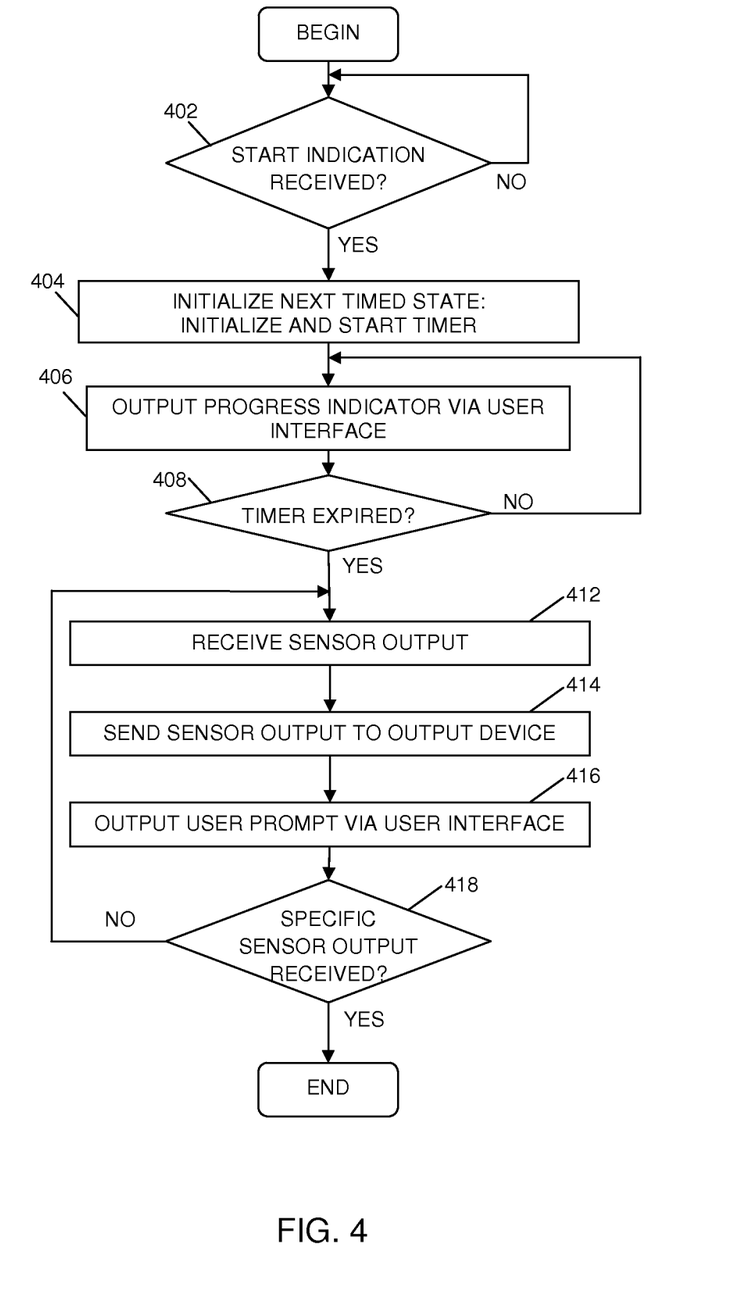
FIG. 4 illustrates a flowchart of a general method for performing a process that includes a timed sub-process and a sensor monitoring sub-process, according to an example embodiment.

FIG. 3 illustrates a diagram for a state machine 300 that may be implemented in a system (e.g., systems 100, 200, FIGS. 1, 2) with a sensor subsystem (e.g., sensor subsystem 220, FIG. 2) and a user interface device, according to an example embodiment. For example, the state machine 300 may be implemented by a processing system (e.g., processing system 240 or 262, FIG. 2) included in a container mounted device (e.g., device 210, FIG. 2) or a remote user interface device (e.g., device 260, FIG. 2), in various embodiments. The processing system receives sensor outputs from the sensor subsystem, where the sensor outputs indicate values of one or more variable sensed conditions selected from motion, orientation, change in orientation, acceleration, shock, vibration, magnetic field, pressure, temperature, the presence or absence of one or more chemicals, and humidity level in various embodiments. In addition, the processing system receives information from a timer and/or a counter (e.g., timer/counter 242 or 264, FIG. 2), or the processing system may implement timers and/or counters using a clock signal. The timer and/or counter information may indication the initiation of a timer, the progress of a timer, the expiration of a timer, and/or a value of a counter, in various embodiments. Either way, the sensor outputs and the timer/counter information trigger transitions from one state to another in the state machine 300, as described below.

According to an embodiment, state machine 300 includes at least an idle state 302, a timed state 304, and a sensor monitoring state 306. The performance of a process (e.g., cooking French fries or some other process) may include the performance of a sequence of sub-processes, where each sub-process may be performed in conjunction with being in one of the states 302, 304, 306. The sequence of transitions between states 302, 304, 306 depends on the particular sequence of sub-processes that define the process. Generally, the idle state 302 corresponds to the performance of an idle or waiting sub-process. The timed state 304 corresponds to the performance of a timed sub-process that includes the monitoring of a timer associated with the sub-process, and the sensor monitoring state 306 corresponds to the performance of a sensor monitoring sub-process that includes the monitoring of a sensor output. In various embodiments, each of states 302, 304, 306 may include other types of sub-processes and/or monitoring, as well. For example, while in the idle state 302, one or more timers, counters, and/or sensor outputs also may be monitored (e.g., expiration of a timer and/or the receipt of a specific sensor output may trigger a transition out of the idle state 302). In addition, in an embodiment, while in the timed state 304, one or more sensor outputs may be monitored (e.g., the receipt of a specific sensor output may result in an interruption of a timed sub-process and a transition out of the timed state 304). In addition, in an embodiment, while in the sensor monitoring state 306, one or more timers and/or counters may be monitored (e.g., the expiration of a timer and/or the achievement of a counter value may result in an interruption of a sensor monitoring sub-process and a transition out of the sensor monitoring state 306).

System operation may begin in the idle state 302. In the idle state 302, the system waits for a start indication to be received. While waiting, the system may maintain output devices in an inactive state (e.g., the output devices may be off) or in a default state that indicates that the system is waiting for a user to initiate a process. Depending on the process to be performed, the start indication may come in the form of a sensed condition (i.e., the receipt of a sensor output that indicates that corresponds to starting a process). For example, a sensed condition that may correspond to a start indication may be movement of a container or item to which the sensor subsystem is affixed, the attainment of an orientation of the container or item, a particular acceleration of the container or item, the attainment of a temperature sensed by the sensor subsystem, the presence of a chemical sensed by the sensor subsystem, and/or the absence of a chemical, as sensed by the sensor subsystem. Alternatively, a start indication may come in the form of a user input. For example, the user may press a start button, speak a start command, or provide some other type of user input.

In any event, depending on the sequence of steps to be performed in the process, receipt of a start indication may cause the state machine 300 to transition from the idle state 302 either to the timed state 304 or the sensor monitoring state 306. Thereafter, performance of the process may include any sequence of transitions between the timed state 304 and the sensor monitoring state 306, including transitions from either state 304, 306 back to itself. In other words, a process may include performing a first timed sub-process while in the timed state 304, and upon completion of the first timed sub-process, the process may remain in or transition back into the timed state 304 to perform a second timed sub-process. In other example embodiments, a transition from the timed state 304 back into the timed state 304 may occur upon the receipt of a specific sensor output (e.g., a timed sub-process may be interrupted when a specific sensor output is received, and another timed sub-process may thereafter be performed). Similarly, a process may include performing a first sensor monitoring sub-process while in the sensor monitoring state 306, and upon completion of the first sensor monitoring sub-process, the process may remain in or transition back into the sensor monitoring state 306 to perform a second sensor monitoring sub-process. In other example embodiments, a transition from the sensor monitoring state 306 back into the sensor monitoring state 306 may occur upon the expiration of a timer or when a particular counter value is received (e.g., a sensor monitoring sub-process may continue to be performed until expiration of a timer, and/or a sensor monitoring sub-process may be repeated a pre-defined number of times, as counted by a counter, such as to ensure that a user performs a particular action the pre-defined number of times).

As mentioned above, a timed sub-process performed in conjunction with the timed state 304 includes monitoring a timer. For example, a timed sub-process may include initiating and starting a timer, and monitoring the timer to determine when the timer expires. While monitoring the timer, the occurrence of an event (e.g., the sensing of motion or some other event) or the failure of an event to occur may cause the timer to be re-set. However, generally a timed sub-process includes waiting for a timer having a duration associated with the particular sub-process to expire. Upon expiration of the timer, and depending on the sequence of sub-processes embodied in the process, the state machine 300 may transition back into the timed state 304 to perform another timed sub-process, may transition to the idle state 302 (e.g., when the timed sub-process just completed was the last sub-process of the process, and the timer that just expired was the final timer), or may transition to the sensor monitoring state 306 to perform a sensor monitoring sub-process.

As also mentioned above, a sensor monitoring sub-process performed in conjunction with the sensor monitoring state 306 includes monitoring a sensor output. For example, a sensor monitoring sub-process may include monitoring a sensor output to wait for a specific sensor output to be received. For example, a "specific" sensor output may be a sensor output having particular value, a sensor output that exceeds a threshold, a sensor output that falls below a threshold, and/or a sensor output that falls within a range of values. Accordingly, a sensor monitoring sub-process may include receiving a sequence of sensor outputs, and determining whether a received sensor output has a specific sensor output value. When a determination is made that a received sensor output has the specific sensor output value, and depending on the sequence of sub-processes embodied in the process, the state machine 300 may transition back into the sensor monitoring state 306 to perform another sensor monitoring sub-process, may transition to the idle state 302 (e.g., when the sensor monitoring sub-process just completed was the last sub-process of the process, and the specific sensor output value just received was the final specific sensor output value), or may transition to the timed state 304 to perform a timed sub-process.

In summary, in a generalized embodiment, a processing system may implement a state machine 300 having at least a timed state 304 and a sensor monitoring state 306. Upon entry into the timed state 304, the processing system starts a timer, and the processing system may transition from the timed state 304 to the sensor monitoring state 306 (or to another state) upon expiration of the timer. While in the sensor monitoring state 306, the processing system waits for a specific sensor output value to be received, and the processing system may transition from the sensor monitoring state 306 to the timed state 302 (or to another state) when the sensor output corresponds to the specific sensor output value. In other embodiments, a state machine may include additional states associated with additional types of sub-processes. In such embodiments, the state machine may or may not allow direct transitions (i.e., transitions without an intermediate state) between timed states and sensor monitoring states.

FIG. 4 illustrates a flowchart of a general method for performing a process that includes a timed sub-process and a sensor monitoring sub-process, according to an example embodiment. More specifically, the flowchart of FIG. 4 embodies a relatively simple process flow for a process that begins in an idle state (e.g., idle state 302, FIG. 3), transitions to a timed state (e.g., timed state 304, FIG. 3) to perform a timed sub-process, transitions to a sensor monitoring state (e.g., sensor monitoring state 306, FIG. 3) to perform a sensor monitoring sub-process, and subsequently ends. More specifically, block 402 corresponds to a sub-process performed while the process is in an idle state, blocks 404, 406, and 408 correspond to a timed sub-process performed while in a timed state, and blocks 412, 414, 416, and 418 correspond to a sensor monitoring sub-process performed while in a sensor monitoring state. It should be understood that a different sub-process may be included in a process flow that includes transitions between states in a different order, transitions between multiple timed and/or sensor monitoring sub-processes, and/or the performance of additional sub-processes of other types.

According to an embodiment, the process begins in an idle state (e.g., idle state 302, FIG. 3) by determining whether a start indication has been received, in block 402. As described previously, a start indication may be the detection of a sensed condition, the receipt of a user input, or some other action that indicates the start of the process. Until a start indication is received, the process remains in the idle state.

Once a start indication has been received, the process transitions into a timed state (e.g., timed state 304, FIG. 3), and an initialization process for the timed state is performed in block 404. According to an embodiment, initialization of the timed process includes initializing a timer with a value that corresponds to a duration of time in which the process will remain in the timed state, and thereafter starting the timer. In block 406, a human-perceptible progress indicator optionally may be output (e.g., by an output device 246 or 268, FIG. 2) while the process is in the timed state. For example, the progress indicator may include an illuminated light or LED, a strobed light or LED, a verbal statement output via a speaker, a message or icon displayed on a display device, and so on.

In block 408, a determination is made whether the timer has expired. If not, then the system may continue to output the progress indicator in block 406. When the timer has expired, the process transitions into a sensor monitoring state (e.g., sensor monitoring state 406, FIG. 4). The sensor monitoring state may begin by beginning to receive and process sensor outputs in block 412. As discussed previously, depending on the particular type of sensor monitoring sub-process, the sensor outputs may be received from any of a variety of different types of sensors, including an accelerometer, a gyroscope, a pressure sensor, a temperature sensor, a chemical sensor, a magnetometer, and a humidity sensor (e.g., sensors 222-228, FIG. 2).

In block 414, in an embodiment in which the device that contains the sensor (e.g., container mounted device 110, 210, FIGS. 1, 2) is remote from the device that provides the user prompts (e.g., user interface device 130, 260, FIGS. 1, 2), the sensor output is transmitted from the container mounted device to the user interface device. Alternatively, in an embodiment in which the sensor and the user interface are included within the same device (e.g., within a single container mounted device), block 414 may be excluded from the process.

In block 416, a human-perceptible user prompt optionally may be output (e.g., by an output device 246 or 268, FIG. 2) while the process is in the sensor monitoring state. For example, the prompt may include illuminating a light or LED, strobing a light or LED, outputting a verbal statement via a speaker, displaying a message or icon on a display device, and so on. According to an embodiment, the prompt may be selected to prompt the user to perform some action that is likely to cause the sensor being monitored to produce a specific sensor output value. For example, the prompt may be selected to prompt the user to move a container or item to which the sensor is attached, to change an orientation of a container or item to which the sensor is attached, to change the environment of a container or item to which the sensor is attached (e.g., to change the pressure, the temperature, chemicals in the environment, or a humidity level). For example, to change the environment, the prompts may prompt the user to move the container or item into a chamber or area with a different pressure, temperature, chemical makeup, or humidity level. Alternatively, the prompts may prompt the user to perform some other action to change the pressure, temperature, chemical makeup, or humidity level of the environment without moving the container or item to which the sensor is attached (e.g., by operating a pressure control, temperature control, or gas valve, which control the pressure, temperature, chemical makeup, or humidity level of the environment, respectively).

In block 418, a determination is made whether a specific sensor output has been received. For example, as mentioned previously, a "specific" sensor output may be a sensor output having particular value, a sensor output that exceeds a threshold, a sensor output that falls below a threshold, and/or a sensor output that falls within a range of values. Until a determination is made that a received sensor output has the specific sensor output value, the method may iterate as shown, by continuing to output user prompts. When a determination has been made that a received sensor output has the specific sensor output value, the method may end.

In conjunction with FIGS. 3 and 4, embodiments of a general state diagram and method flowchart were described. FIGS. 5 and 6 are intended to provide a specific example of a process, which may be implemented using variations of the general state diagram and method flowchart of FIGS. 3 and 4. More specifically, FIG. 5 illustrates state diagram 500 that may be implemented in a system (e.g., systems 100, 200, FIG. 1, 2) configured to cook French fries based on sensed motion of a French fry basket (e.g., basket 120, FIG. 1), according to an example embodiment. FIG. 6 illustrates a flowchart of a method for cooking French fries using a French fry basket that includes a subsystem for sensing motion of a French fry basket and a user interface device for providing user prompts based on the sensed motion, according to an example embodiment. Because the transitions through the state machine 500 and the flowchart (FIG. 6) follow each other closely, FIGS. 5 and 6 are described together, below, and should be viewed together for enhanced understanding.

The state machine 500 and the implementation of the steps of the flowchart (FIG. 6) may be implemented by a processing system (e.g., processing system 240 or 262, FIG. 2) included in a container mounted device (e.g., device 110, 210, FIGS. 1, 2) or a remote user interface device (e.g., device 130, 260, FIGS. 1, 2), in various embodiments. The processing system receives sensor outputs from one or more accelerometers (e.g., accelerometer 222, FIG. 2) and/or gyroscopes (e.g., gyroscope 223, FIG. 2) of the sensor subsystem (e.g., sensor subsystem 220, FIG. 2), and the sensor outputs indicate values of acceleration along one or more directions (e.g., along x, y, and/or z axes), and/or change in orientation. In addition, the processing system receives information from a timer (e.g., timer 242 or 264, FIG. 2), or the processing system may implement timers using a clock signal. The timer information may indication the initiation of a timer, the progress of a timer, and/or the expiration of a timer, in various embodiments. Either way, the sensor outputs and the timer information trigger transitions from one state to another in the state machine 500, as described below.

According to an embodiment, state machine 300 includes at least an idle state 502, multiple timed states 504, 506, 510, and multiple sensor monitoring states 508, 512. The process of cooking French fries includes the performance of a sequence of sub-processes, where each sub-process may be performed in conjunction with being within one of the states 502, 504, 506, 508, 510, 512. An example sequence of state transitions for performing a process of cooking French fries will now be described. The below described example process includes the following steps to be performed by the user: 1) load the French fry basket with uncooked French fries; 2) immerse the basket of uncooked French fries into hot oil for a period of 3 minutes (first frying step); 3) lift the basket from the oil and shake it to loosen the partially-cooked French fries; 4) immerse the basket of partially cooked French fries into the hot oil for a period of 3 minutes (second frying step); 5) lift the basket from the oil and turn the basket upside down over a container to unload the French fries.

In a typical fast food cooking environment, according to conventional practices, a French fry basket is a passive device (i.e., it has no associated electronics), and a user interacts with a timing system distinct from the French fry basket to ensure that the user is cooking the French fries properly. This process may involve, for example, the user pressing buttons at certain points in the process in order to start timers, and listening for alerts to indicate when a next step is to be performed. In such a system, there is no way for the system to ensure that the user actually performs the various steps properly. According to an embodiment, the French fry basket is an active device, which includes at least a sensor subsystem (e.g., sensor subsystem 220, FIG. 2) capable of detecting acceleration of the basket in at least one direction, and capable of detecting a change in orientation of the basket. In addition, according to various embodiments, the system automatically may initiate timers at various points in the process to monitor the duration of various steps, and may detect movement of the basket to indicate when the user has performed a step (e.g., shaking the basket, unloading the basket, and so on). During the various processes, the system is further capable of providing human-perceptible progress indications and user prompts, to guide the user through the process.

With the sensing and intelligence configured in the system, the user is not required to press buttons or perform other actions to initiate timers, and so on. Accordingly, embodiments include a system and process that are user friendly, and that are more likely to result in the correct performance of a French fry cooking process. According to a further embodiment, the system may store various types of data during performance of the process (e.g., in data storage 244, 266, FIG. 2), in order to keep a record of how the process was actually performed. For example, the system also may track sensor outputs and times between user actions (e.g., acceleration values to indicate how hard the user shook the basket, the time that the user left the basket in the oil during any given cooking step, the time it took the user to unload the basket, and so on), and that information may be accessed later and used for training or other purposes.

Figure 5:
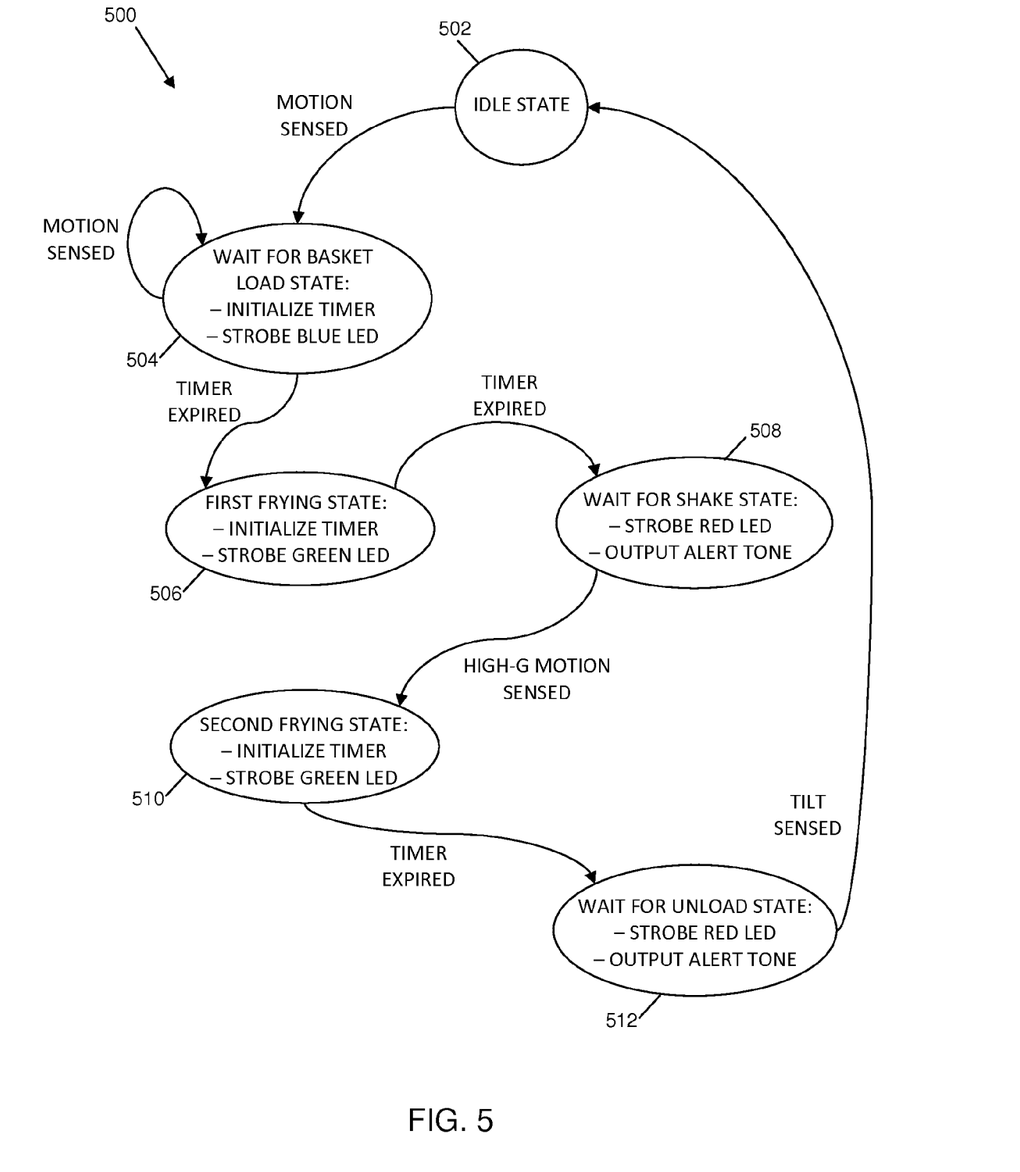
FIG. 5 illustrates a diagram of a state machine that may be implemented in a system configured to cook French fries based on sensed motion of a French fry basket, according to an example embodiment.
Figure 6:
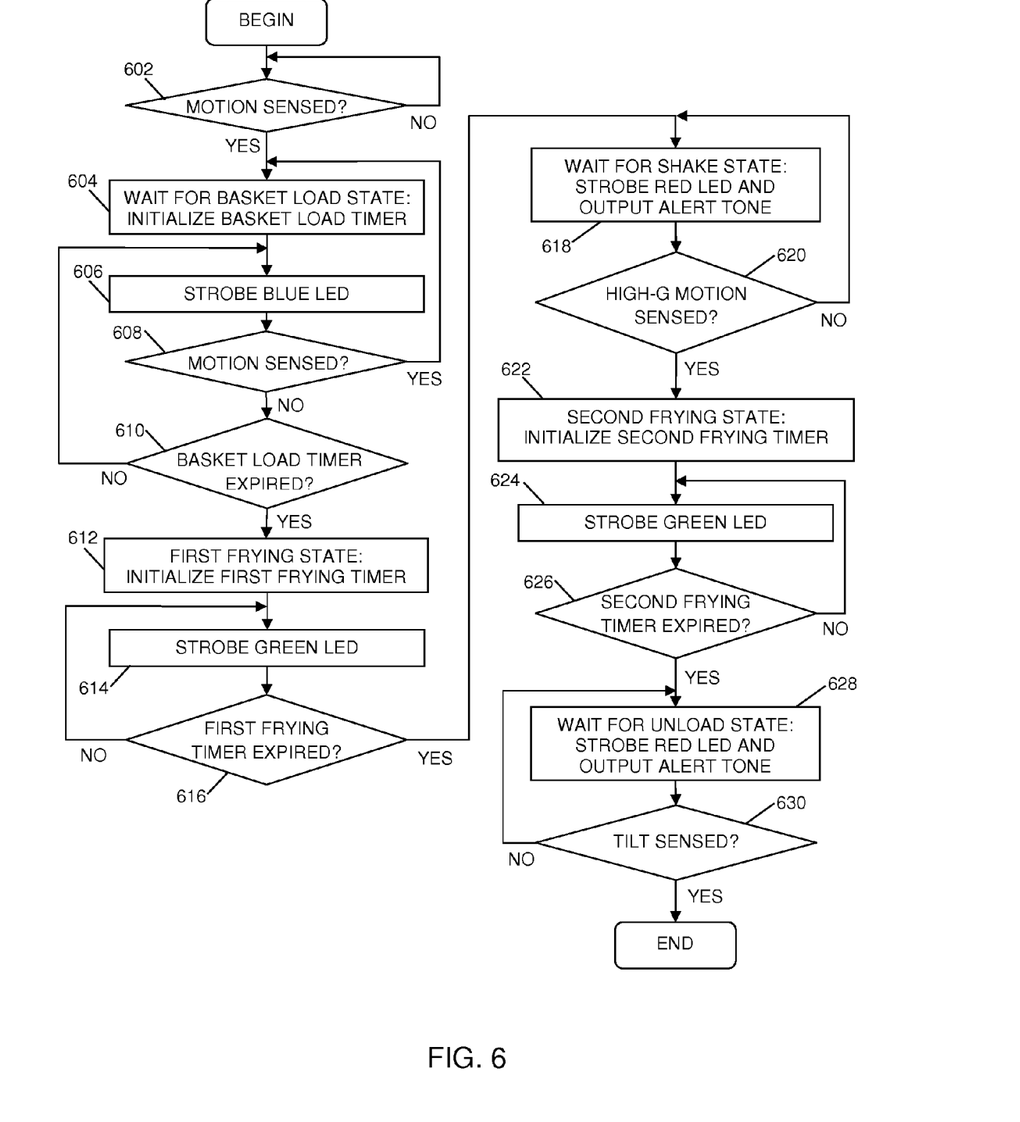
FIG. 6 illustrates a flowchart of a method for cooking French fries using a French fry basket that includes a subsystem for sensing motion and a user interface device for providing user prompts based on the sensed motion, according to an example embodiment.

Referring now to FIGS. 5 and 6, system operation may begin in the idle state 502 (FIG. 5) and in block 602 (FIG. 6), which corresponds to the beginning of the French fry cooking process. At the beginning of this process, the French fry basket should be sitting empty (e.g., on a counter) and the system is waiting for the user to begin performing the first step of the above-described example French fry cooking process (i.e., the system is waiting for the user to begin loading the French fry basket with uncooked French fries). In the idle state 502, the system waits for a start indication to be received. According to an embodiment, the start indication comes in the form of sensed motion of the basket, which would occur when the user begins the loading process. Accordingly, in block 602, a determination is made whether motion has been sensed. If not, the system continues to wait. More specifically, the system receives sensor outputs (e.g., from accelerometer 222, FIG. 2), which indicate whether or not the basket is being moved. When the sensor outputs indicate that the basket is being moved (e.g., acceleration values exceeding a motion threshold are received), the system may determine that motion has been sensed that corresponds to a start indication. Alternatively, a start indication may come in the form of a user input. For example, the user may press a start button on either the container mounted device or the user interface device, speak a start command which is received by a microphone on either the container mounted device or the user interface device, or provide some other type of user input.

In any event, receipt of a start indication causes the state machine 500 to transition from the idle state 502 to a first timed state 504 ("wait for basket load state"), and for the flowchart to transition to block 604. As long as the user continues to move the basket, the system assumes that the user is still performing the process of loading the basket. Accordingly, the system continues to monitor whether or not the user is moving the basket.

According to an embodiment, upon entry into the wait for basket loading state 504, the system initializes and starts a basket load timer, in block 604. The basket load timer may have a relatively short duration (e.g., 10 seconds or less), for example, as the timer is used to determine whether or not the user has stopped moving the basket for a relatively short duration of time (e.g., indicating that the user has immersed the basket in the hot oil). During the basket load state, the system may produce a human-perceptible indicia, which indicates the step to be performed. For example, in block 606, the system may strobe a blue LED, output a verbal command (e.g., "please load the basket"), or produce some other indicia. Prior to expiration of the basket load timer, the system determines whether or not it has sensed motion, in block 608. If the system detects motion (e.g., the user is still moving the basket during the loading process), the system re-initializes and starts the timer (e.g., returns to block 604 and remains in the wait for basket load state 504). When the sensor outputs indicate that the basket is not being moved, the system makes a further determination of whether or not the basket load timer has expired, in block 610. If not, then the system continues to produce the human-perceptible indicia (in block 606) and monitor for sensed motion (in block 608).

When the system determines that the basket load timer has expired, the state machine 500 transitions from the wait for basket load state 504 to a second timed state 506 ("first frying state"), and the flowchart transitions to block 612. While in the first frying state 504, the system assumes that the user has immersed the basket of uncooked fries into the hot oil to commence the first frying step (e.g., the user has performed the second step of the above-described French fry cooking process of immersing the basket of uncooked French fries into the hot oil).

According to an embodiment, upon entry into the first frying state 506, the system initializes and starts a first frying timer, in block 612. The first frying timer may have a relatively long duration (e.g., about 3 minutes), for example. During the first frying state, the system may produce a human-perceptible indicia, which indicates the step being performed and/or what the user should be doing. For example, in block 614, the system may strobe a green LED, output a verbal command (e.g., "please allow the basket to remain in the oil"), or produce some other indicia. In block 616, a determination is made of whether or not the first frying timer has expired. If not, then the system continues to produce the human-perceptible indicia (in block 614) and monitor the first frying timer (in block 616).

When the system determines that the first frying timer has expired, the state machine 500 transitions from the first frying timer state 506 to a first sensor monitoring state 508 ("wait for shake state"), and the flowchart transitions to block 618. While in the wait for shake state 508, the system waits for the user to perform the third step of the above-described French fry cooking process (e.g., the system waits for the user to lift the basket from the oil and shake it to loosen the partially-cooked French fries). According to an embodiment, upon entry into the wait for shake state 508, the system produces a human-perceptible indicia, which indicates that user action is required. For example, in block 618, the system may strobe a red LED and output an alert tone. In addition or alternatively, the system may output a verbal command (e.g., "please lift and shake the basket") or produce some other indicia. In addition, the system may make a determination, in block 620, whether motion of sufficient magnitude is sensed (e.g., motion having relatively high G force). During the period of time that motion is not sensed, the system may continue to produce the human-perceptible indicia, in block 618, and monitor for the motion, in block 620.

When motion of sufficient magnitude is sensed, the state machine 500 transitions from the wait for shake state 508 to a third timed state 510 ("second frying state"), and the flowchart transitions to block 622. While in the second frying state 510, the system assumes that the user has re-immersed the basket of partially-cooked fries into the hot oil to commence the second frying step (e.g., the user has performed the fourth step of the above-described French fry cooking process of immersing the basket of partially-cooked French fries back into the hot oil).

According to an embodiment, upon entry into the second frying state 510, the system initializes and starts a second frying timer, in block 622. The second frying timer may have a relatively long duration (e.g., about 3 minutes), for example. During the second frying state, the system again may produce a human-perceptible indicia, which indicates the step being performed and/or what the user should be doing. For example, in block 624, the system again may strobe the green LED, output a verbal command (e.g., "please allow the basket to remain in the oil"), or produce some other indicia. In block 626, a determination is made of whether or not the second frying timer has expired. If not, then the system continues to produce the human-perceptible indicia (in block 624) and monitor the second frying timer (in block 626).

When the system determines that the second frying timer has expired, the state machine 500 transitions from the second frying timer state 510 to a second sensor monitoring state 512 ("wait for unload state"), and the flowchart transitions to block 628. While in the wait for unload state 512, the system waits for the user to perform the fifth and final step of the above-described French fry cooking process (e.g., the system waits for the user to lift the basket from the oil and turn the basket upside down over a container to unload the French fries). According to an embodiment, upon entry into the wait for unload state 512, the system produces a human-perceptible indicia, which indicates that user action is required. For example, in block 628, the system again may strobe the red LED and output an alert tone. In addition or alternatively, the system may output a verbal command (e.g., "please lift and unload the basket") or produce some other indicia. In addition, the system may make a determination, in block 630, whether the basket has been tilted (e.g., tilted upside down). During the period of time that basket tilting is not sensed, the system may continue to produce the human-perceptible indicia, in block 628, and monitor for the motion, in block 630. When the system determines that the basket has been tilted, the method may end, and the state machine 500 may transition back to the idle state 502 in preparation for a next iteration of the French fry cooking process.

An embodiment of a system includes a sensor subsystem, a processing system, and an output device. The sensor subsystem is configured to produce a sensor output indicating a value of a variable sensed condition selected from a motion, an orientation, a change in orientation, an acceleration, shock, a vibration, a magnetic field, a pressure, a temperature, a presence of a chemical, an absence of a chemical, and a humidity level. The processing system receives the sensor output and implements a state machine having a first state and a second state. Upon entry into the first state, the processing system starts a timer, and while in the second state, the processing system waits for a specific sensor output value to be received. The processing system transitions from the first state to the second state upon expiration of the timer, and the processing system transitions from the second state to the first state when the sensor output corresponds to the specific sensor output value. When the state machine is in the second state, the output device produces a human-perceptible indicia configured to prompt a human user to perform an action that is likely to cause the sensor to produce the sensor output that corresponds to the specific sensor output value.

An embodiment of a system includes a sensor subsystem, a processing system, and an output device. The sensor subsystem is configured to produce a sensor output indicating acceleration in at least one direction. The processing system receives the sensor output and implements a state machine having a first state and a second state. Upon entry into the first state, the processing system starts a timer. While in the second state, the processing system waits for a specific acceleration value to be received. The processing system transitions from the first state to the second state upon expiration of the timer, and the processing system transitions from the second state to the first state when the sensor output corresponds to the specific acceleration value. When the state machine is in the second state, the output device produces a human-perceptible indicia configured to prompt a human user to perform an action that is likely to cause the sensor to produce the sensor output that corresponds to the specific acceleration value.

A method includes producing, by a sensor, a sensor output indicating a value of a variable sensed condition selected from a motion, an orientation, a change in orientation, an acceleration, a shock, a vibration, a magnetic field, a pressure, a temperature, a presence of a chemical, an absence of a chemical, and a humidity level. The method further includes transitioning into a first state of a state machine, wherein operation in the first state includes starting a timer and monitoring whether the timer has expired. The method further includes transitioning into a second state upon expiration of the timer. Operation in the second state includes monitoring the sensor output, determining whether a specific sensor output value has been received, and producing a human-perceptible indicia configured to prompt a human user to perform an action that is likely to cause the sensor to produce the sensor output that corresponds to the specific sensor output value.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:
1. A system comprising:
a sensor subsystem configured to produce a sensor output indicating a value of a variable sensed condition selected from a motion, an orientation, a change in orientation, an acceleration, shock, a vibration, a magnetic field, a pressure, a temperature, a presence of a chemical, an absence of a chemical, and a humidity level;
a processing system that receives the sensor output and implements a state machine having a first state and a second state, wherein upon entry into the first state, the processing system starts a timer, and while in the second state, the processing system waits for a specific sensor output value to be received, and wherein the processing system transitions from the first state to the second state upon expiration of the timer, and the processing system transitions from the second state to the first state when the sensor output corresponds to the specific sensor output value; and an output device which, when the state machine is in the second state, produces a human-perceptible indicia configured to prompt a human user to perform an action that is likely to cause the sensor to produce the sensor output that corresponds to the specific sensor output value.

2. The system of claim 1, further comprising:

a portable container;

a container mounted device that includes the sensor subsystem and a first wireless communication interface, wherein the container mounted device is affixed to the portable container; and a user interface device that includes the processing system, the output device, and a second wireless communication interface, wherein the first wireless interface of the container mounted device communicates the sensor output to the second wireless interface of the user interface device via an air interface.

3. The system of claim 1, further comprising:

a portable container; and a container mounted device that includes the sensor subsystem, the processing system, and the output device, wherein the container mounted device is affixed to the portable container.

4. The system of claim 1, further comprising:

a container with a receptacle configured to hold items, wherein the container is configured to allow a liquid to enter the receptacle and contact the items when the receptacle is immersed in the liquid, and to allow the liquid to drain from the receptacle when the receptacle is removed from the liquid; and a container mounted device that includes the sensor subsystem, wherein the container mounted device is affixed to the portable container.

5. The system of claim 1, further comprising:

a portable container configured to hold items, wherein the portable container is selected from a basket, a rack, a tray, a pan, and a pot; and a container mounted device that includes the sensor subsystem, wherein the container mounted device is affixed to the portable container.

6. The system of claim 1, wherein the output device includes one or more devices selected from a speaker, a light, a light emitting diode, a vibration-producing device, a display device, a computing device, a headset, display glasses, a pager, a telephone, and a radio.

7. The system of claim 1, wherein the output device is configured to produce a human-perceptible indicia selected from an audible tone, a spoken statement, a light, a vibration, and a displayed indicia.

8. A system comprising:

a sensor subsystem configured to produce a sensor output indicating acceleration in at least one direction;

a processing system that receives the sensor output and implements a state machine having a first state and a second state, wherein upon entry into the first state, the processing system starts a timer, and while in the second state, the processing system waits for a specific acceleration value to be received, and wherein the processing system transitions from the first state to the second state upon expiration of the timer, and the processing system transitions from the second state to the first state when the sensor output corresponds to the specific acceleration value; and an output device which, when the state machine is in the second state, produces a human-perceptible indicia configured to prompt a human user to perform an action that is likely to cause the sensor to produce the sensor output that corresponds to the specific acceleration value.

9. The system of claim 8, further comprising:

a portable container configured to hold items, wherein the portable container is selected from a basket, a rack, a tray, a pan, and a pot; and a container mounted device that includes the sensor subsystem, wherein the container mounted device is affixed to the portable container, and wherein the human-perceptible indicia is configured to prompt the human user to move the portable container.

10. The system of claim 9, wherein the portable container is a basket configured to hold food and to allow the food to be immersed in a liquid.

11. The system of claim 8, further comprising:

a portable container;

a container mounted device that includes the sensor subsystem and a first wireless communication interface, wherein the container mounted device is affixed to the portable container; and a user interface device that includes the processing system, the output device, and a second wireless communication interface, wherein the first wireless interface of the container mounted device communicates the sensor output to the second wireless interface of the user interface device via an air interface.

12. The system of claim 8, further comprising:

a portable container; and a container mounted device that includes the sensor subsystem, the processing system, and the output device, wherein the container mounted device is affixed to the portable container.

13. The system of claim 8, wherein the output device includes one or more devices selected from a speaker, a light, a light emitting diode, a vibration-producing device, a display device, a computing devices, headsets, display glasses, a pager, a telephone, and a radio.

14. The system of claim 8, wherein the output device is configured to produce a human-perceptible indicia selected from an audible tone, a spoken statement, a light, a vibration, and a displayed indicia.

15. A method comprising:

producing, by a sensor, a sensor output indicating a value of a variable sensed condition selected from a motion, an orientation, a change in orientation, an acceleration, a shock, a vibration, a magnetic field, a pressure, a temperature, a presence of a chemical, an absence of a chemical, and a humidity level;

transitioning into a first state of a state machine, wherein operation in the first state includes starting a timer and monitoring whether the timer has expired;

upon expiration of the timer, transitioning into a second state, wherein operation in the second state includes monitoring the sensor output, determining whether a specific sensor output value has been received, and producing a human-perceptible indicia configured to prompt a human user to perform an action that is likely to cause the sensor to produce the sensor output that corresponds to the specific sensor output value.

16. The method of claim 15, further comprising:
wirelessly communicating the sensor output to a remote user interface device, wherein the remote user interface device is configured to produce the human-perceptible indicia.

17. The method of claim 15, wherein producing the human-perceptible indicia comprises producing a human-perceptible indicia selected from an audible tone, a spoken statement, a light, a vibration, and a displayed indicia.

18. The method of claim 15, wherein the sensor is an accelerometer, and wherein:
producing the sensor output comprises producing a sensor output indicating acceleration in at least one direction; and
transitioning into the first state comprises transitioning into the first state when the sensor output corresponds to a specific acceleration value.

19. The method of claim 18, wherein the accelerometer is affixed to a portable container, and wherein:
producing the human-perceptible indicia comprises producing an indicia configured to prompt the human user to move the portable container.

20. The method of claim 15, further comprising:
when the specific sensor output value has been received, transitioning from the second state to the first state.

* * * * *